(12) United States Patent
Müller

(10) Patent No.: US 6,685,216 B2
(45) Date of Patent: Feb. 3, 2004

(54) AIRBAG DEVICE AND METHOD OF OPERATING AN AIRBAG DEVICE

(75) Inventor: Olaf Müller, Rüsselsheim (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/266,175

(22) Filed: Oct. 7, 2002

(65) Prior Publication Data

US 2003/0067146 A1 Apr. 10, 2003

Related U.S. Application Data

(63) Continuation of application No. PCT/DE01/01379, filed on Apr. 9, 2001.

(30) Foreign Application Priority Data

| Apr. 7, 2000 | (DE) | 200 06 449 U |
| Jun. 28, 2000 | (DE) | 200 11 357 U |

(51) Int. Cl.⁷ .............................................. B60R 21/20
(52) U.S. Cl. ................................. 280/728.3; 280/732
(58) Field of Search ........................... 280/728.3, 731, 280/732, 733, 736

(56) References Cited

U.S. PATENT DOCUMENTS

| 4,773,673 A | * | 9/1988 | Sakurai | 280/728.3 |
| 5,899,488 A | | 5/1999 | Müller | |
| 6,422,592 B2 | * | 7/2002 | Reiter et al. | 280/728.3 |
| 6,527,295 B2 | * | 3/2003 | Muller | 280/728.3 |

FOREIGN PATENT DOCUMENTS

| DE | 197 26 878 A1 | 10/1998 |
| DE | 197 33 896 A1 | 2/1999 |
| DE | 197 50 182 A1 | 5/1999 |
| DE | 198 44 412 A1 | 7/1999 |
| DE | 299 14 924 U1 | 2/2000 |
| EP | 0 867 346 A1 | 9/1998 |
| JP | 05 050 893 | 3/1993 |
| WO | WO 99/58389 | 11/1999 |
| WO | WO 99/61288 | 12/1999 |

* cited by examiner

*Primary Examiner*—Paul N. Dickson
*Assistant Examiner*—Toan C To
(74) *Attorney, Agent, or Firm*—Laurence A. Greenberg; Werner H. Stemer; Manfred Beck

(57) ABSTRACT

An airbag device includes an airbag module and at least one airbag cover which is connected to a piston via pulling devices. The piston can be subjected to pyrotechnical action in order to produce a linear movement of the piston. When the piston is caused to move, the airbag cover moves from a closed position, in which the airbag cover blocks an exit path of the airbag out of the airbag module, into an open position, in which the airbag cover clears the exit path of the airbag out of the airbag module. The piston is forcibly guided to perform a helical movement so that the piston, when caused to move, performs a rotational movement during its linear movement, thus winding up the pulling devices. A method for operating an airbag device is also provided.

15 Claims, 11 Drawing Sheets

AIRBAG DEVICE AND METHOD OF OPERATING AN AIRBAG DEVICE

CROSS-REFERENCE TO RELATED APPLICATION

This application is a continuation of copending International Application No. PCT/DE01/01379, filed Apr. 9, 2001, which designated the United States and was not published in English.

BACKGROUND OF THE INVENTION

Field of the Invention

The invention relates to an airbag device and to a method of operating an airbag device.

Published, Non-Prosecuted German Patent Application Nos. DE 197 26 878.1 and DE 197 33 896.8, European Patent Application No. EP 0 867 346 A1, and International Publication No. WO 99/61288 disclose conventional airbag devices and methods of triggering or operating such airbag devices.

SUMMARY OF THE INVENTION

It is an object of the invention to provide an improved airbag device and a method of operating or triggering an airbag device.

It is in particular an object of the invention to provide a space-saving construction for an airbag device and an operating method for such a construction. The present invention can be employed as a supplement to the subject matter of the above-mentioned patent applications, and, in an advantageous manner, can further reduce the so-called "aggressiveness" of the airbag in that a mechanism pulls the airbag cover into the dashboard.

The present invention relates in particular to improvements of airbag systems and exemplary embodiments dealt with in the above-mentioned patent applications, especially as regards the construction of the airbag device and the triggering/operating control system and, specifically, to a device and a method for controlling an airbag flap or airbag cover. The disclosure of the above-mentioned patent applications especially as regards the construction of the airbag device and the triggering/operating control system and, specifically, the embodiments for controlling an airbag flap are incorporated by reference into the present application.

With the foregoing and other objects in view there is provided, in accordance with the invention, an airbag device, including:

an airbag module defining an airbag exit path, the airbag module including a piston, the piston being configured to be subjected to a pyrotechnical action such that the piston performs a linear movement when being acted upon;

pulling devices;

at least one airbag cover connected to the piston via the pulling devices, the at least one airbag cover being movable from a closed position into an open position when the piston is acted upon, the at least one airbag cover, when in the closed position blocking the airbag exit path, and the at least one airbag cover, when in the open position, clearing the airbag exit path; and a helical positive guide for guiding the piston such that the piston, when being acted upon and performing the linear movement, also performs a rotational movement for winding up the pulling devices.

In other words, the invention provides an airbag device with an airbag module and at least one airbag cover, which is connected to a piston through the use of pulling devices, which piston can be subjected to pyrotechnical action in order to produce a linear movement, and, when the piston is acted upon, the airbag cover moves out of a closed position, in which it blocks an exit path of an airbag out of the airbag module, into an open position, in which it clears the exit path of the airbag out of the airbag module, a helical positive guide being provided for the piston, and the pulling devices being configured in the form of cables, so that, due to the action upon it, the piston performs a rotational movement during its linear movement, winding up the pulling devices as it does so.

This is a particularly advantageous way of using a linear actuation of the piston, which can be achieved easily, reliably and economically, and combining it with a space-saving way of winding up the pulling devices.

Preferably, the positive guide is formed by at least one guideway along the path of movement of the piston, which piston has at least one extension, which rests against the guideway or engages in the guideway. In this configuration, the at least one extension can be formed by a bolt or a screw. It is also possible for two extensions, spaced apart in the direction of its linear motion, to be provided on the piston, and for a guideway to be assigned to each of these two extensions. In this configuration, it is particularly preferred if the pulling devices engage on the piston through the use of the extensions of the piston.

It is furthermore preferred if the pulling devices include at least one wire, cable or strap, through the use of which the airbag cover is connected to the piston. In this configuration, provision is preferably made for the cable or the wire to be composed of metal, or for the strap to be composed of a textile material or plastic or a mixture thereof.

According to further preferred embodiments of the invention, the piston is placed in a cup-like manner over a gas generator of the airbag module and/or the piston is guided in a housing of the airbag module, in particular, if appropriate, the piston is guided by a housing of the gas generator.

The guideway preferably includes a control edge or a slotted guideway.

With the objects of the invention in view there is also provided, a method of operating an airbag device, the method includes the steps of:

providing an airbag module having a piston;

providing at least one airbag cover connected to the piston via pulling devices; and subjecting the piston to a pyrotechnical action such that the piston performs a helical movement for winding up the pulling devices such that the pulling devices pull on the at least one airbag cover and move the at least one airbag cover from a closed position blocking an airbag exit path into an open position clearing the airbag exit path.

In other words, the object of the invention is furthermore achieved by an operating method for an airbag device, wherein at least one airbag cover is moved out of a closed position, in which it blocks an exit path of an airbag out of the airbag module, into an open position, in which it clears the exit path of the airbag out of the airbag module, through the use of pulling devices, by a piston, which is subjected to pyrotechnical action in order to produce a linear movement, and, due to the action upon it, the piston performs a helical or screw-like movement, winding up the pulling devices as it does so, so that the pulling devices pull the airbag cover and move it from the closed position to the open position.

Other features which are considered as characteristic for the invention are set forth in the appended claims.

Although the invention is illustrated and described herein as embodied in an airbag device and a method of operating an airbag device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
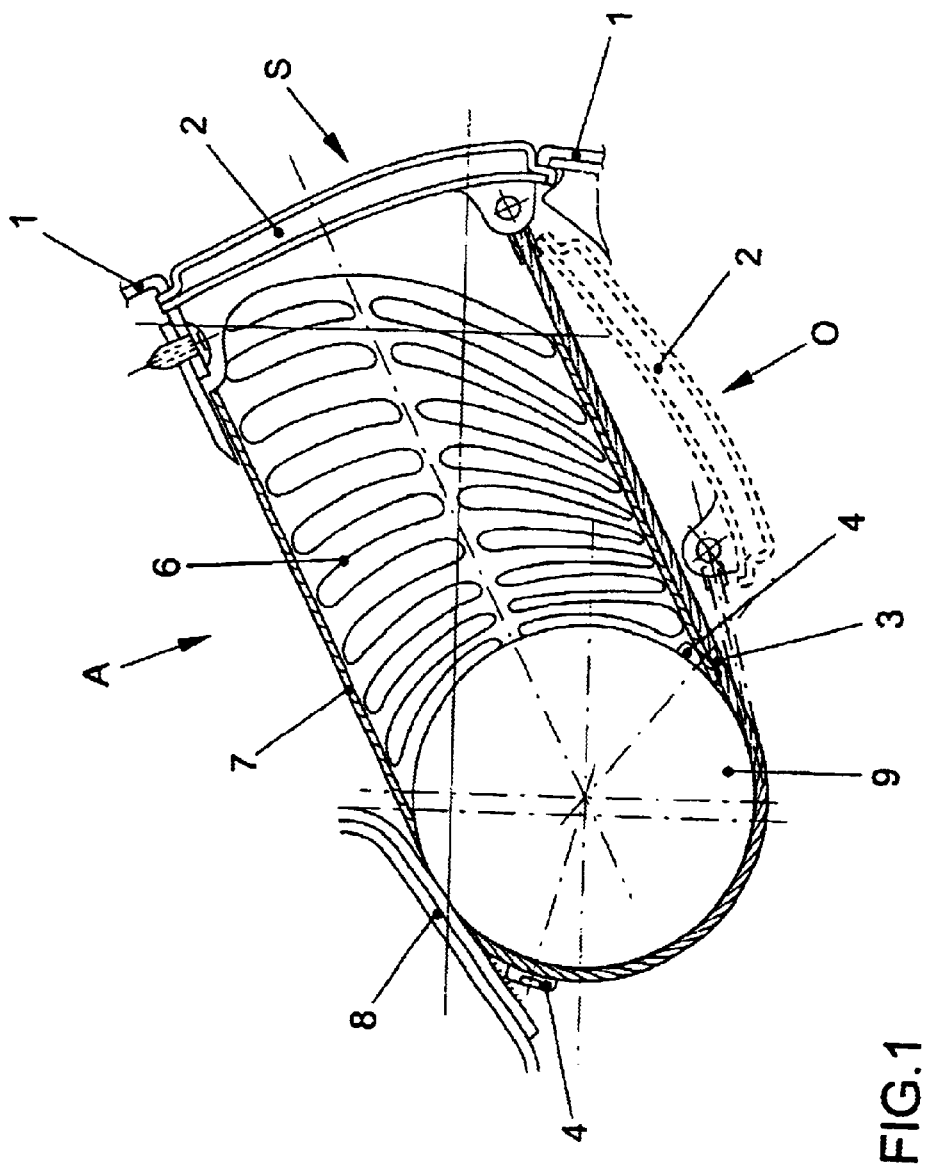
FIG. 1 is a diagrammatic sectional view of a first exemplary embodiment of an airbag device according to the invention illustrating alternate positions of the airbag cover wherein the open position of the airbag cover is indicated with dashed lines.

The same reference numerals in the individual figures of the drawings denote the same or similar components or components with the same or a similar action. The illustrations in the drawings also show and explain features that are not provided with reference numerals, irrespective of whether such features are described below. On the other hand, features that are contained in the present description but are not visible or shown in the drawing will be readily understood by a person of skill in the art.

Referring now to the figures of the drawings in detail and first, particularly, to FIG. 1 thereof, there is shown a schematic cross section through a dashboard 1 with an airbag cover 2 that can be opened easily. The airbag cover 2 is plugged or clipped at the top and bottom into the dashboard 1 surrounding it. Cables 3 are attached to the airbag cover 2 as pulling devices (preferably one cable at each of the two lateral ends of the airbag cover 2). These cables 3 are secured on a piston 5 (shown in FIG. 2) through the use of respective screwed joints 4. FIG. 1 also shows an airbag 6 of the airbag-module housing 7, the airbag advantageously being folded "softly," the bodywork (car body) 8 and an airbag module 9. The position of the airbag cover 2 is shown before and after a crash, i.e. before and after a triggering of the airbag device A. The airbag cover 2 is shown in a closed position S and in an open position O, wherein the open position O of the cover 2 is illustrated with dashed lines.

Figure 2:
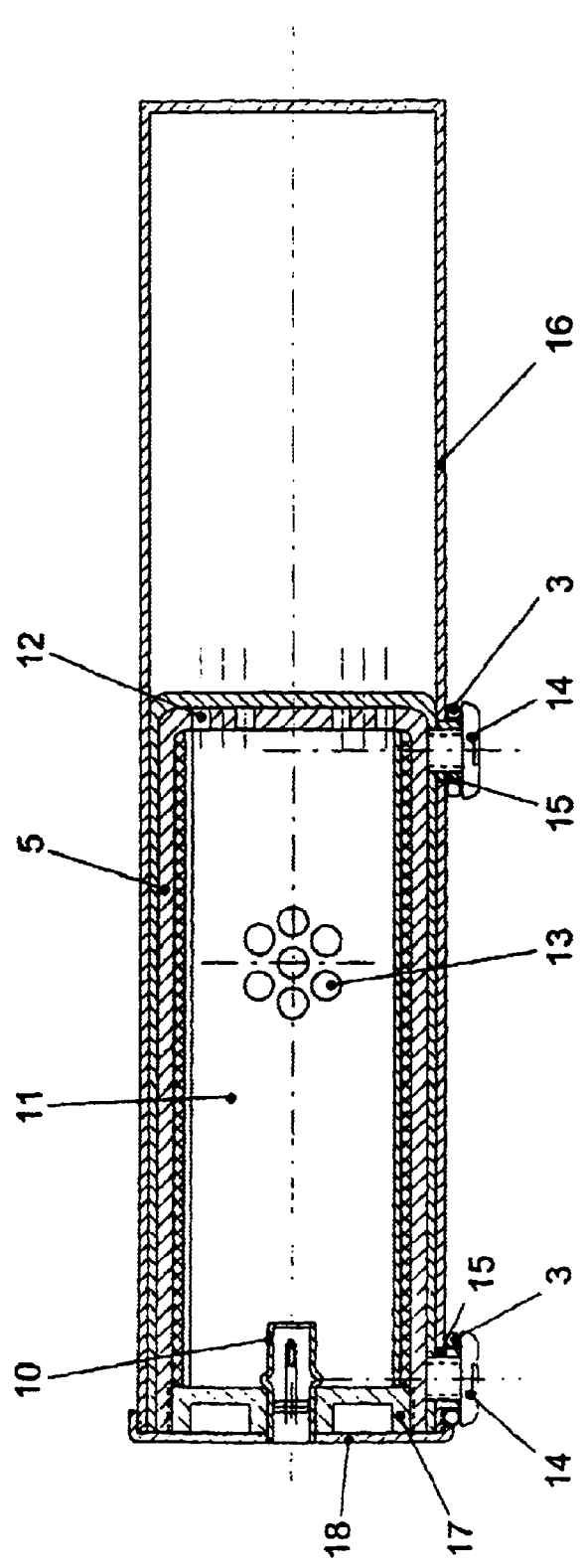
FIG. 2 is a diagrammatic sectional view of the airbag module of the airbag device shown in FIG. 1 wherein the sectional plane of FIG. 2 is perpendicular to the sectional plane of FIG. 1.

FIG. 2 shows a section through the airbag module 9 perpendicular to FIG. 1. The parts that are nested into one another, such as the ignition cartridge 10, the gas generator 11, the piston 5, the gas throughflow holes 12 for the actuation of the piston 5 (at one end) and the gas throughflow holes 13 for the airbag 6 are illustrated such that the properties and function of these elements can understood by this illustration alone. The cables 3 are secured on the piston 5 through the use of screws 14. Distance rings 15 ensure mobility of the piston 5 in the housing 16. A gas generator housing 16 and the gas generator 11 are preferably provided with covers 17 and 18.

Figure 3:
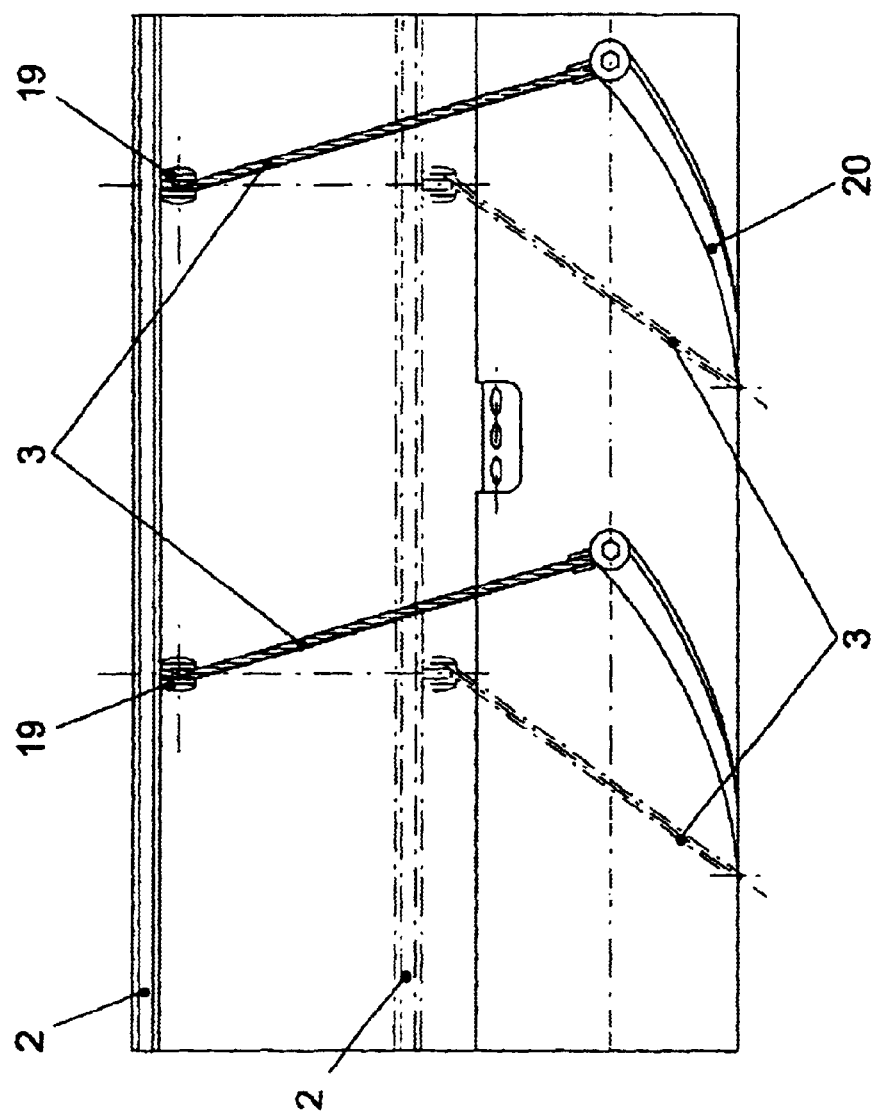
FIG. 3 is a diagrammatic plan view of an airbag module and an airbag cover according to the first exemplary embodiment of an airbag device according to the invention illustrating an open position and a closed position of the airbag cover wherein the open position of the airbag cover is indicated in dash-dotted lines.

FIG. 3 shows cable fastenings 19 on the airbag cover 2 in a side view of the airbag module 9. Guideways 20 in the form of slotted guideways are formed in the gas generator housing 16. In the event of a crash, the piston 5 must thus move forward in a positively guided manner like a screw (helically) in the guideways 20 with the screws 14, driven by the gas blast of the gas generator 11 through the gas throughflow holes 12. In addition to their "longitudinal movement" in accordance with the linear component of motion of the piston 5, the cables 3 therefore also perform a lateral angular motion in accordance with the rotational movement of the piston 5, as indicated in dash-dotted lines. This simple technique is useful particularly when, for example, small airbag covers 2 are embodied merely as separate parts that can be detached easily.

Figure 4:
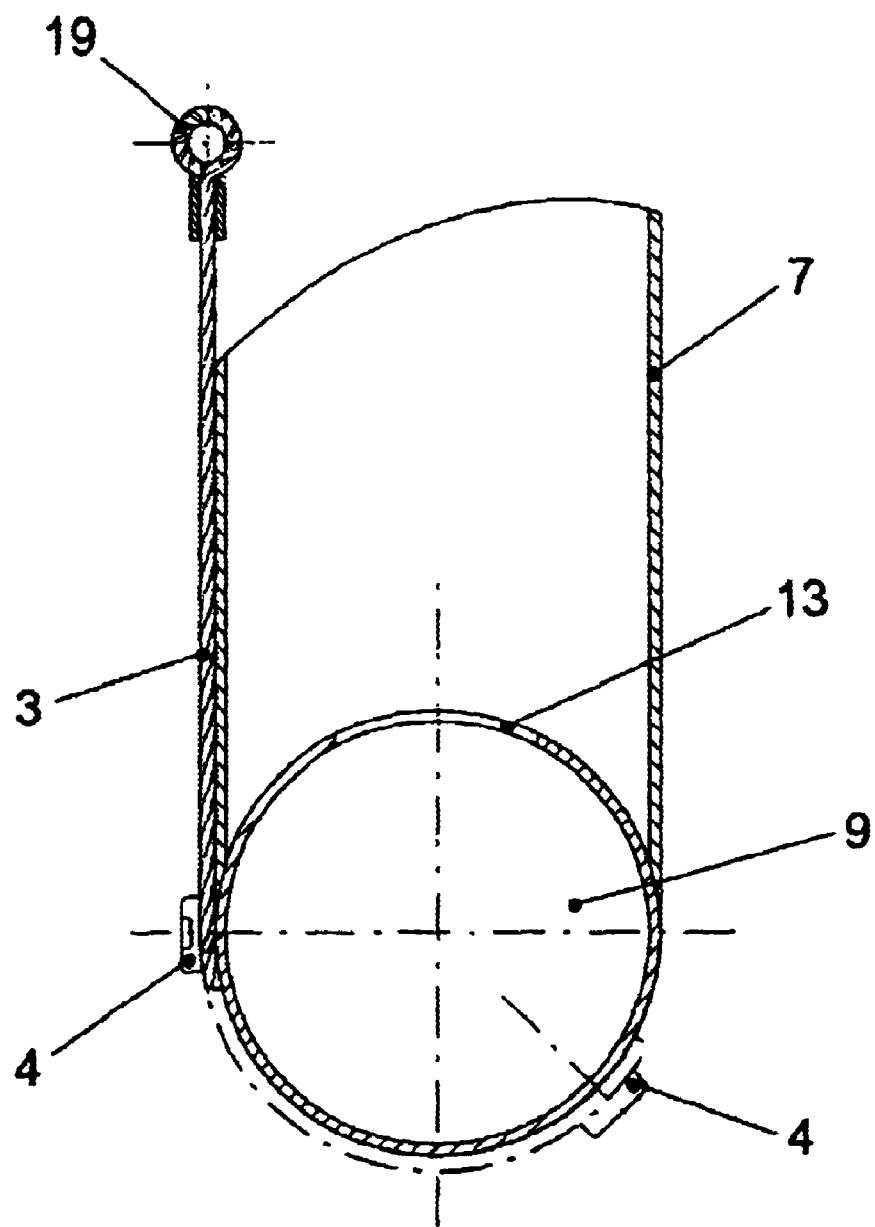
FIG. 4 is a diagrammatic sectional view of an airbag module and a cable attached to a screwed joint in accordance with the first embodiment of the airbag device according to the invention wherein the screwed joint is illustrated in alternate positions.

For the purpose of further illustration, FIG. 4 is a sectional view at the level of the screwed joint 4. This illustrates how the piston 5, which is also rotating, moves the screwed joint 4 to a new position during a crash and hence pulls the airbag cover 2 toward the airbag module 9.

Figure 5:
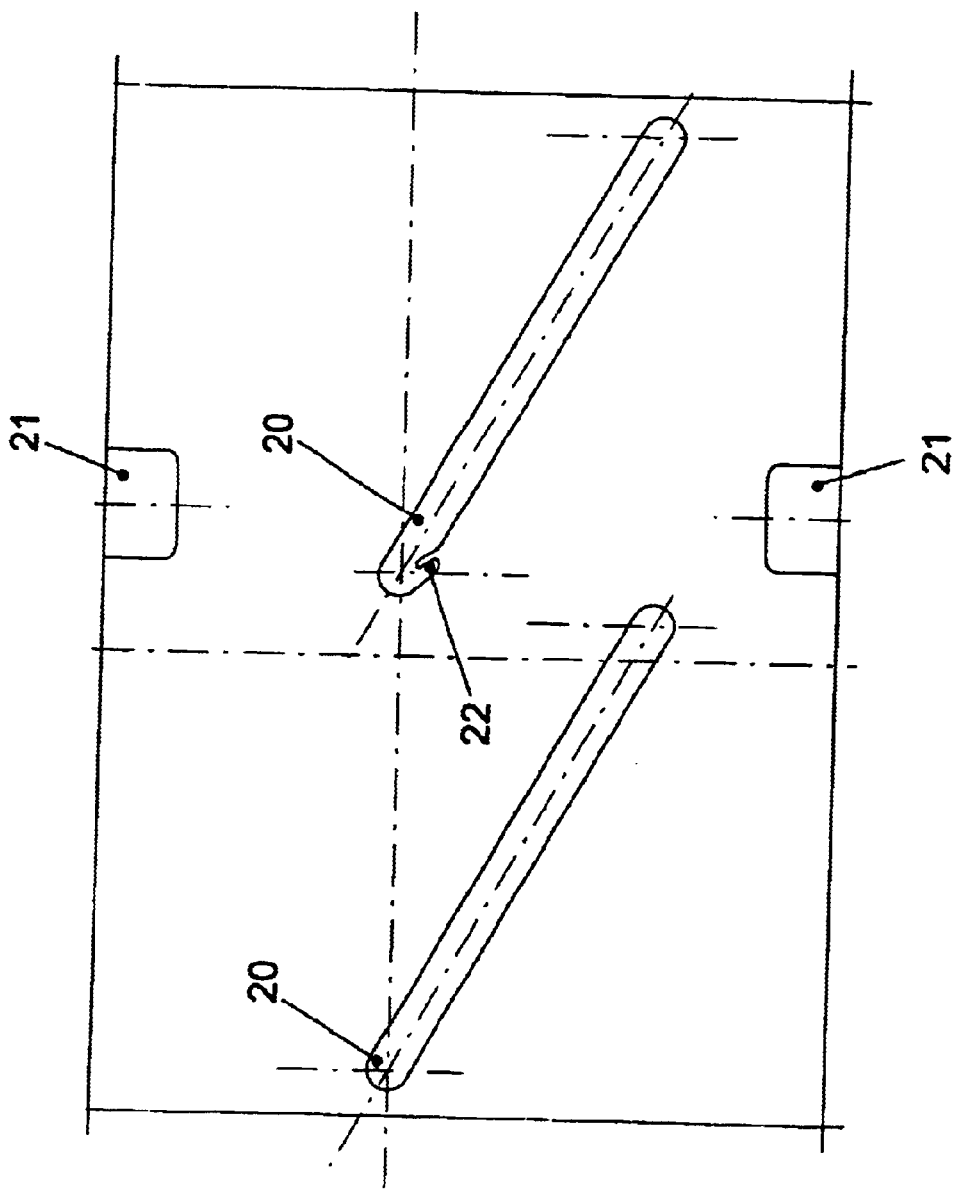
FIG. 5 is a diagrammatic developed view of a gas generator housing for the first exemplary embodiment of an airbag device according to the invention for illustrating guideways and gas passage openings in the gas generator housing.

For the purpose of further illustrating the invention, the gas generator housing 16 is shown in an unwound state in FIG. 5. This shows the guideways 20 and a gas passage hole 21. A "brake" 22 is formed at the end of at least one of the guideways 20. This "brake" 22 acts by bending and clamping the screw(s) 14 in the end position. The brake 22 is intended to prevent the airbag cover 2 from rebounding due to its impact energy (about 400 g). Other blocking, clamping and locking mechanisms are readily familiar to the person skilled in the art and can be employed accordingly. The same applies to the screws 14, which are to be understood merely as examples of appropriate extensions that interact with a guideway in an appropriate manner.

The following combinations of features are furthermore within the scope of the present invention:

The airbag device preferably contains a mechanism that is driven by an explosive, which pulls the airbag cover into the airbag module. A refinement of such an embodiment is characterized in that the mechanism is configured in such a way that a cup-shaped piston sealed off with an accurate fit is placed over the generator and is at the same time guided in the housing of the module. In addition, the piston can move like a screw, i.e. helically, in guideways in the housing in such a way that cables or other connecting devices, e.g. straps, starting therefrom are moved in the transverse and longitudinal directions due to the helically embodied guideways. A cable fastening can be attached to the piston and guided in the guideway in such a way that the cable fastening and the guideway form a unit. The guideway(s) can furthermore be configured in such a way that there is a sufficient component of motion to move the airbag cover(s). The mechanism for moving the airbag cover into the module or dashboard is very simple. Such airbag devices are advantageous particularly for light airbag covers or airbag covers that are easy to open, e.g. those that are not integrated into the body of the dashboard.

Figure 6:
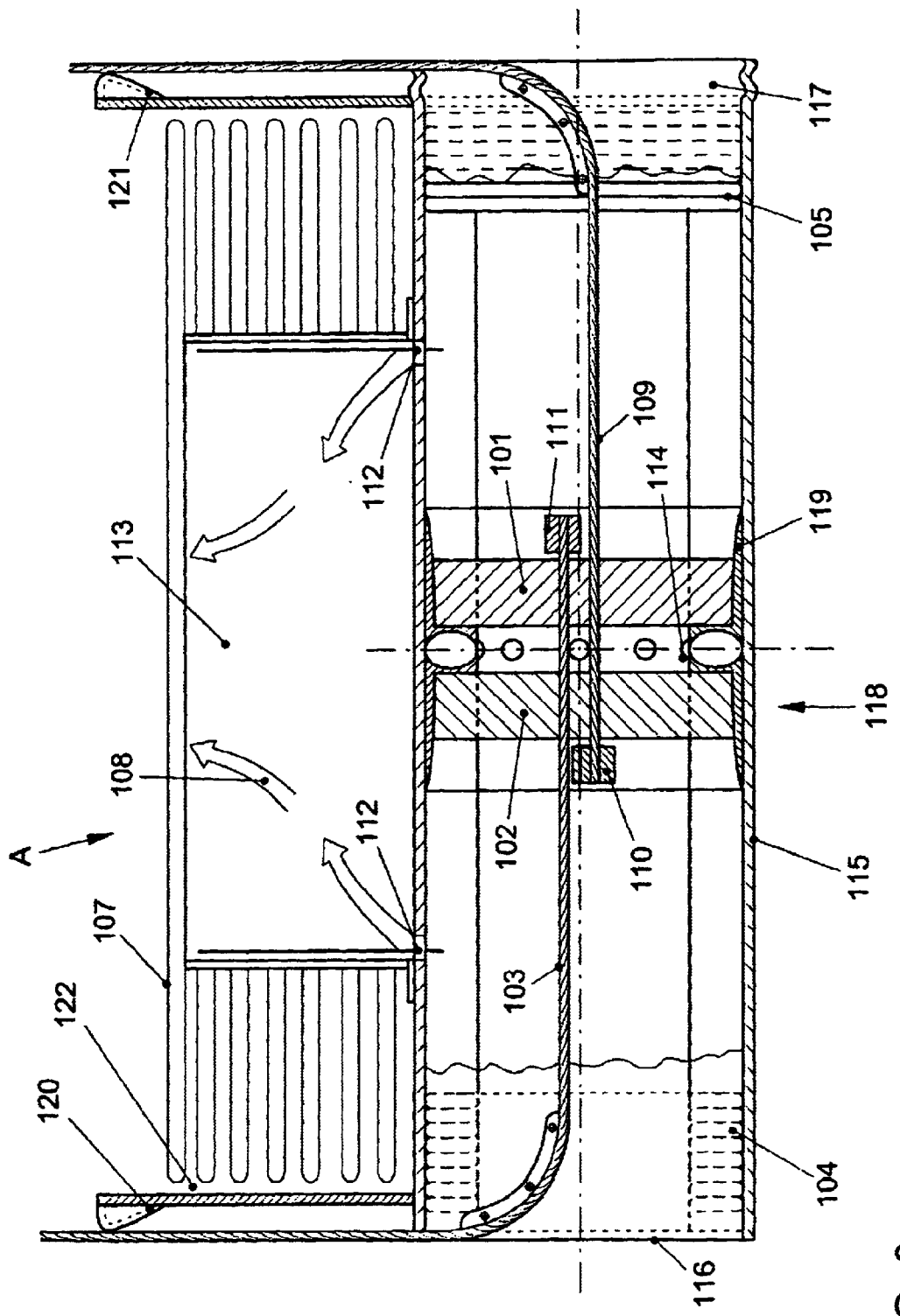
FIG. 6 is a diagrammatic sectional view of a first variant of a second exemplary embodiment of an airbag device according to the invention.

FIG. 6 shows an airbag generator 118, around which annular pistons 101 and 102 are mounted in such a way that a gas outlet 106 is formed between the annular pistons 101 and 102. Pulling cables 103 and 109 are secured on the annular pistons 101 and 102 through the use of thimbles 110 and 111.

The annular pistons 101 and 102 are encased by a cylindrical tube 115 on the outside to form a compression space 114. The cylindrical tube 115 is provided with covers 116 and 117 at both ends to limit the movement of the annular pistons 101 and 102. Damping devices 104 and 105 are fitted to limit the energy of the annular pistons 101 and 102. The annular pistons 101 and 102 are sealed off with a plastic 119, e.g. POM (polyolefin material), that melts due to pressure and/or temperature. FIG. 6 also shows how the gas stream 108 is supplied to the airbag 107 via the controlled gas supply 112.

Due to an explosion in the generator 118, the annular pistons 101 and 102 move in such a way that the pulling cables 103 and 109 are pulled downward. End walls 120 and 121 of an airbag case or airbag-module housing 122 are provided with the shaped feature 126 in such a way that airbag flaps 123, 124 rest there and slide about the latter along a roof-shaped gable 125, as shown in FIG. 7.

Figure 7:
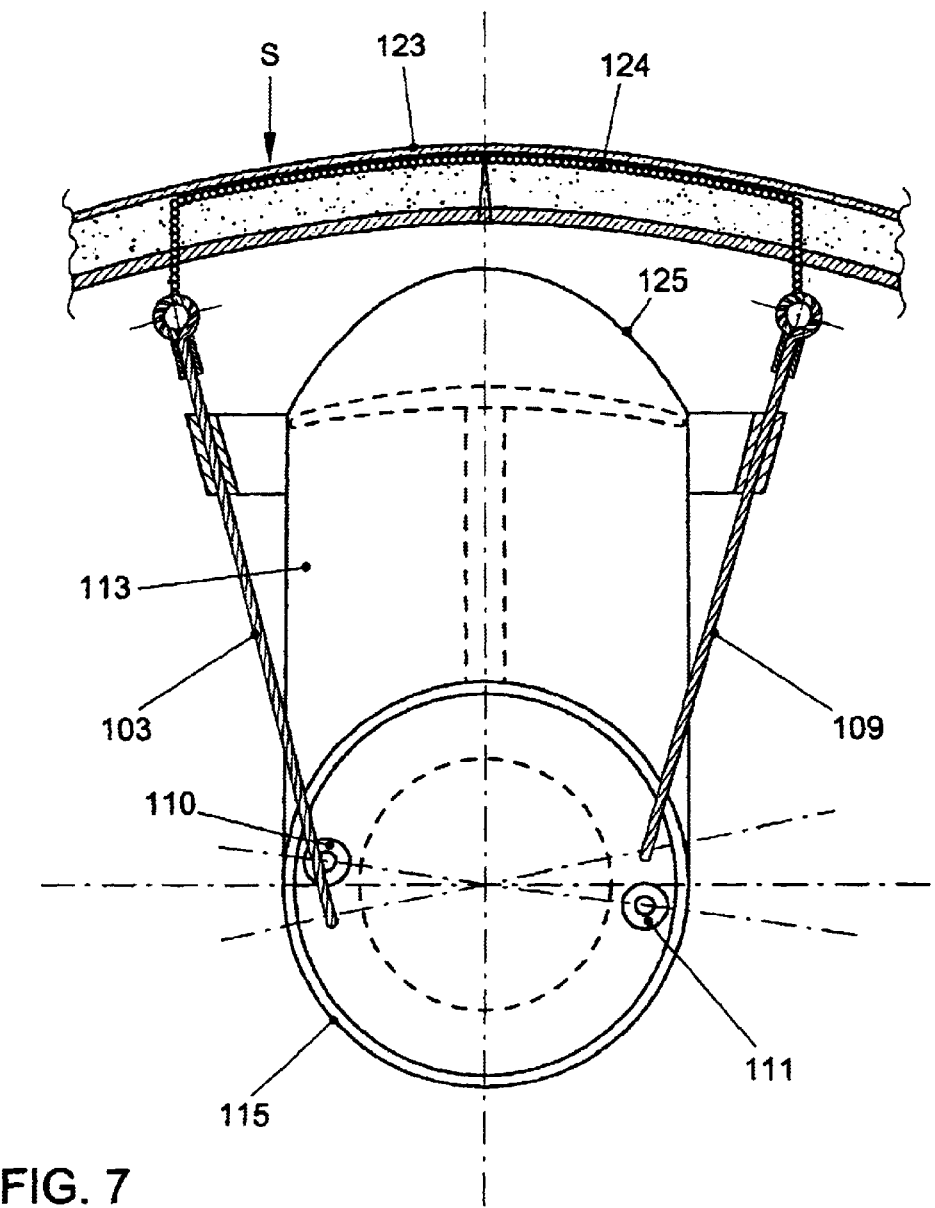
FIG. 7 is a diagrammatic side view of an airbag device as shown in FIG. 6.

FIG. 7 shows a side view of FIG. 6. The pulling cables 103 and 109, the thimbles 110 and 111, the airbag module 113, the cylindrical tube 115, the generator 118, the airbag flaps 123, 124 and the gable 125 of the airbag module 113 can be seen here.

Figure 8:
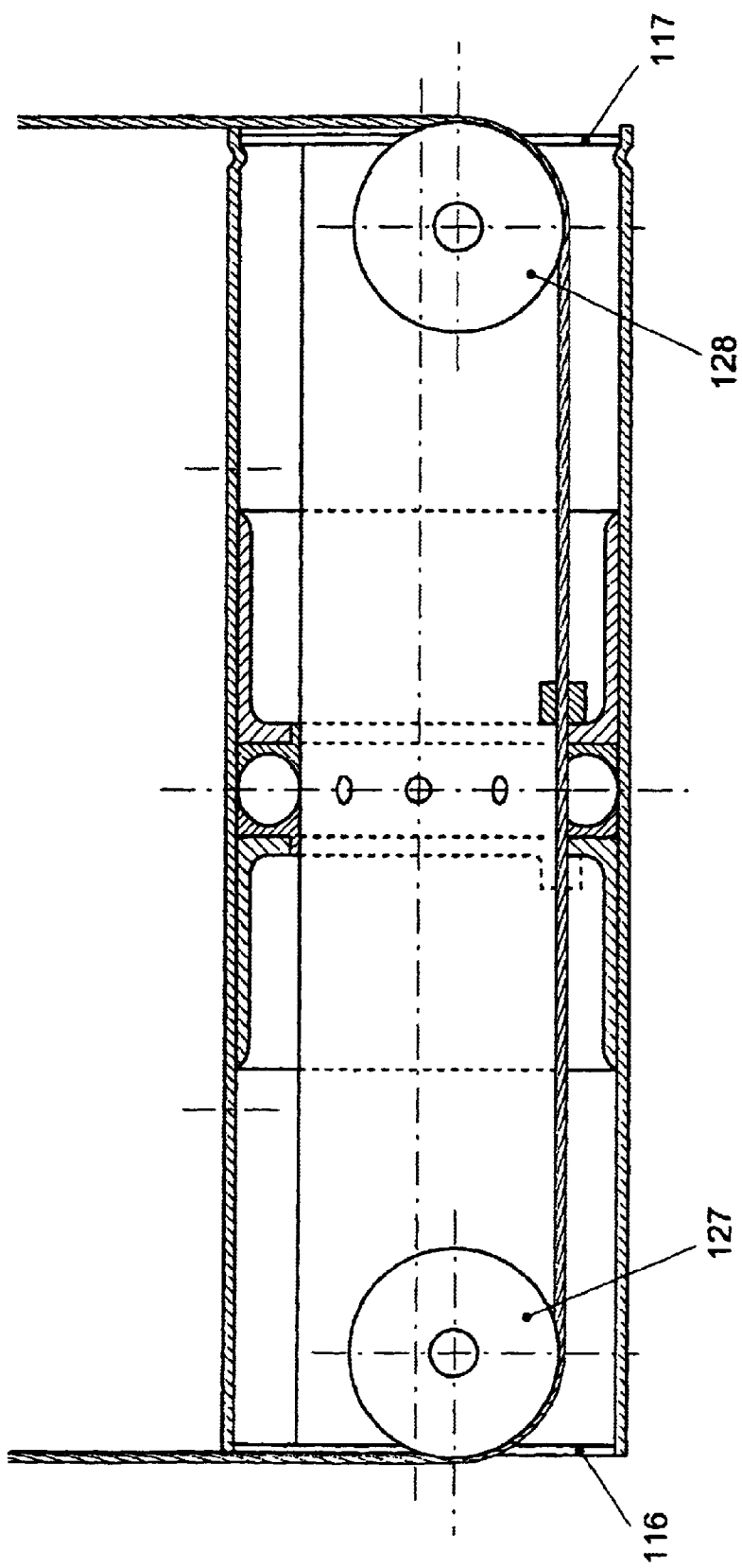
FIG. 8 is a diagrammatic sectional view of a second variant of the second exemplary embodiment of an airbag device according to the invention wherein pulleys are used for deflecting cables.
Figure 9:
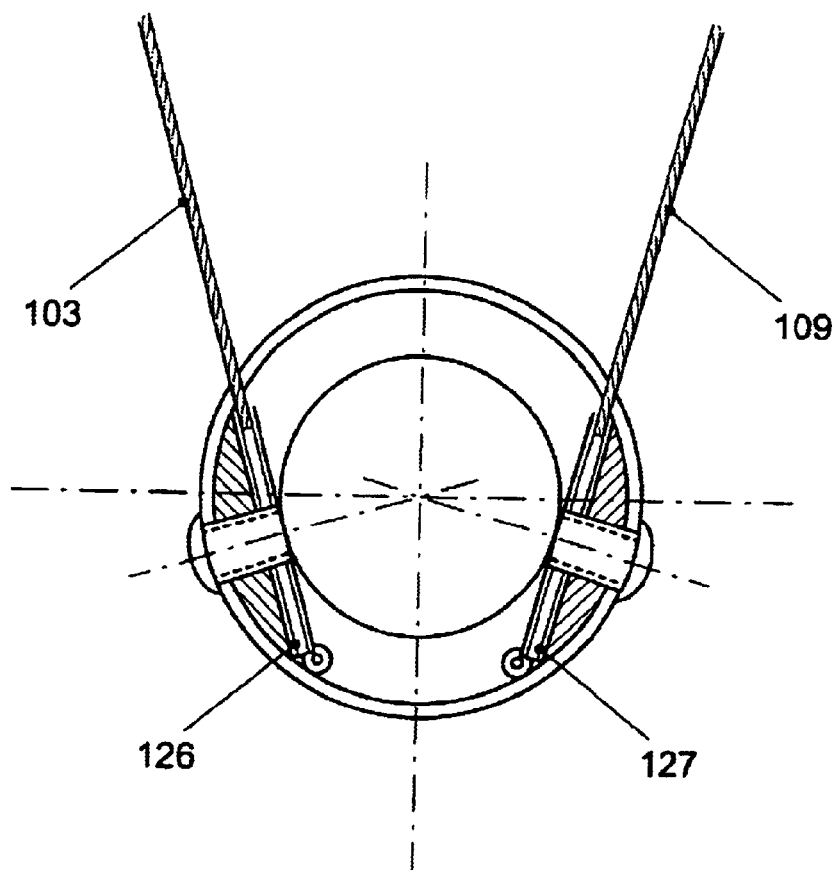
FIG. 9 is a diagrammatic sectional view of the airbag device shown in FIG. 8 wherein the sectional plane of FIG. 9 is perpendicular to the sectional plane of FIG. 8.
Figure 10:
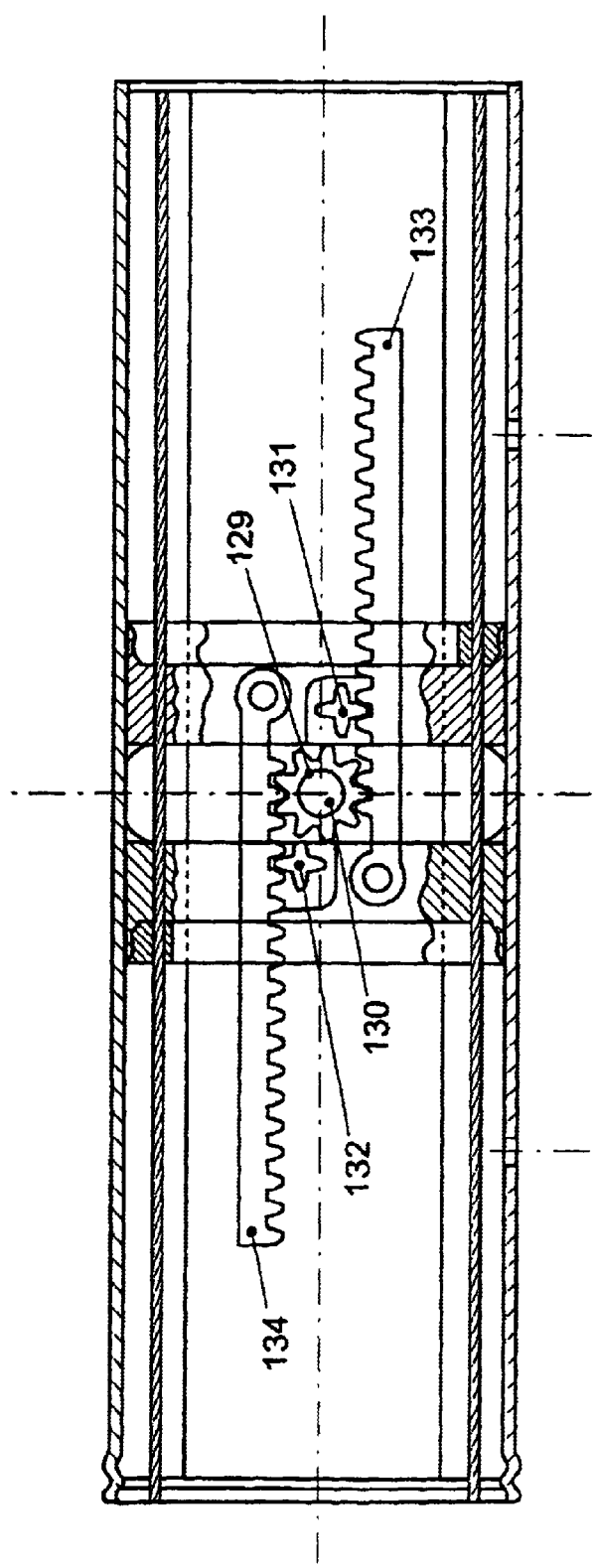
FIG. 10 is a diagrammatic sectional view of a third variant of the second exemplary embodiment of an airbag device according to the invention wherein a rack gear is used in order to pull cables.

FIG. 8 shows the same system but with deflection pulleys 127 and 128, which, as shown in FIG. 8, are mounted between the generator 118 and the cylindrical tube 115. This gives a very space-saving solution. The pulling cables 103 and 109 are passed through the cover 116 and 117 in such a way that they can be gripped easily for mounting on the airbag flaps 123 and 124. FIG. 10 shows an alternative mechanism to the two annular pistons 101 and 102 in case the resistance of the airbag flaps causes them to move different distances at different speeds and hence pull the airbag flaps 123 and 124 askew. To avoid this problem, racks 133 and 134 are mounted on the annular pistons 101 and 102 in such a way (FIG. 10) that they are pulled in a positively guided manner over a gearwheel 129 running on a spindle 130 which is secured on the gas generator. This forces the two annular pistons 101 and 102 to move in synchronism. For better sealing, small plastic gearwheels 131 and 132 run simultaneously in pockets of the annular pistons 101 and 102, minimizing the leakage flow of gas and being embodied in such a way that they melt due to pressure and/or heat.

Figure 11:
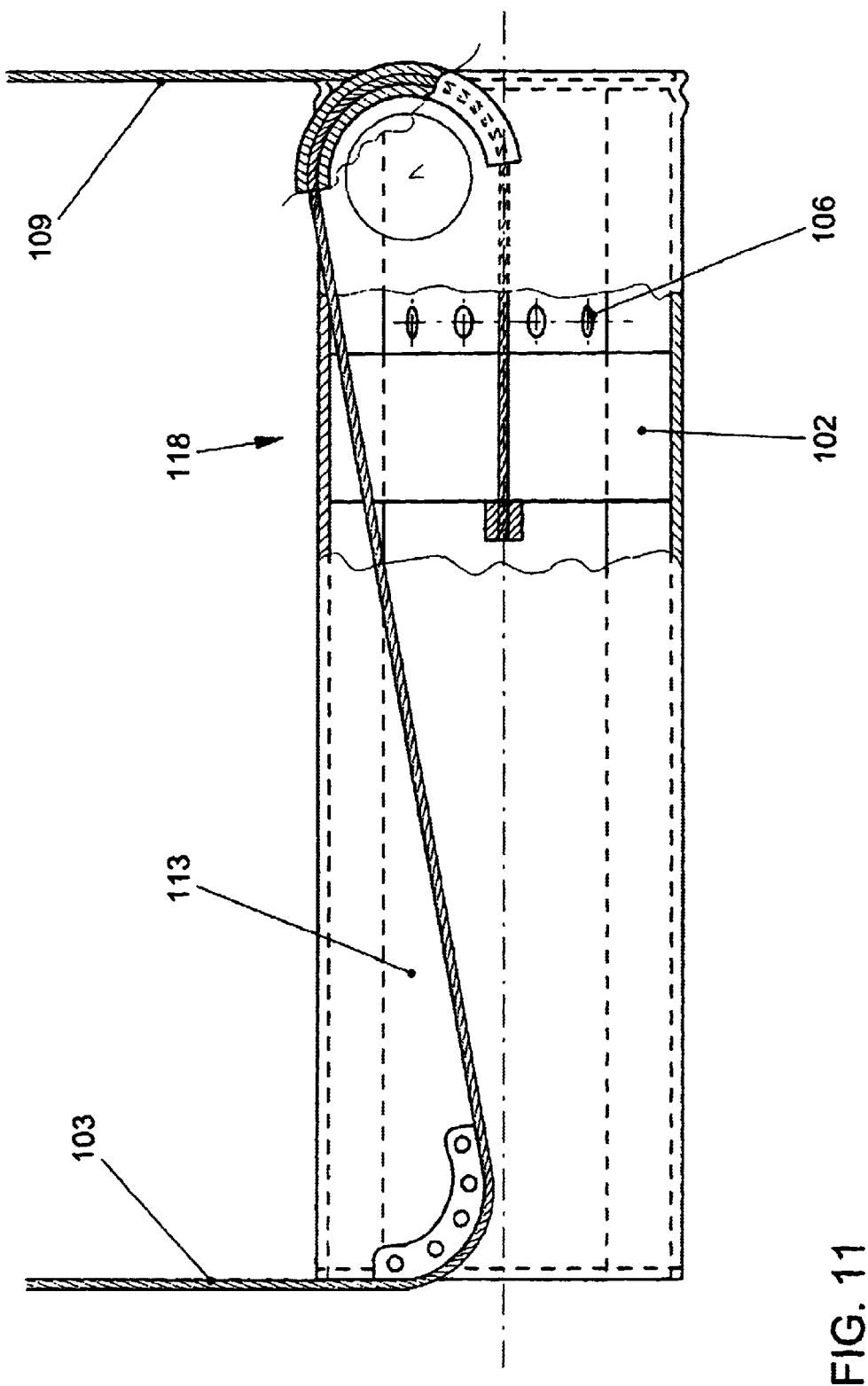
FIG. 11 is a diagrammatic sectional view of a fourth variant of the second exemplary embodiment of an airbag device according to the invention wherein a single piston is used for pulling the cables.

FIG. 11 shows an individual annular piston 102, which is used in the case of a gas outlet 106 on one side of a generator 118. The pulling cables 103 and 109 are guided in the manner shown and, in this alternative, are guided along the outside of the airbag module 113.

Methods of making or using the airbag device according to the invention emerge in a corresponding manner from embodiments of the airbag device.

In summary, an airbag device with a simple airbag-cover pull-in mechanism is provided, which is driven through the use of a piston placed over a generator and by the gas pressure of the latter. In all cases, the movement and force are sufficient for airbag covers that are easy to open (low weight, separate component).

In particular, the invention provides a drive mechanism for flaps of an airbag module in a space-saving construction. This is achieved, according to one aspect, with a helical movement of a piston for winding up pulling cables. According to another aspect of the invention, this is achieved with annular pistons in case the airbag generator is of small diameter and fills the module predominantly lengthways, making it impossible to accommodate a cup-shaped piston, for example. Space-saving annular pistons are preferably used for thin and long generators. Internal guidance of the cables within the module is furthermore advantageous. A piston seal that melts is preferably used. Simple access to the pulling cables at the end is furthermore preferably provided.

The above features and combinations of features of the exemplary embodiment which are illustrated in the drawings serve merely to illustrate the invention by way of example and are not meant to restrict the invention. The scope of the disclosure of the present description in its entirety is determined by what the person skilled in the art can readily gather from the claims but also from the description, the drawing and the complete contents of Published, Non-Prosecuted German Patent Application No. DE 198 44 412 A1 and International Publication No. WO 99/58389 and the above-mentioned applications which were filed for the applicant or the assignee of the present application. In particular, the invention furthermore includes all variants, combinations, modifications and substitutions which the person skilled in the art can gather from the entire disclosure of the present documents, including the earlier applications mentioned at the outset and the specialist knowledge entailed. In particular, all the individual features and configuration options of the invention and of its exemplary embodiments can be combined.

I claim:

1. An airbag device, comprising:
   an airbag module defining an airbag exit path, said airbag module including a piston, said piston being configured to be subjected to a pyrotechnical action such that said piston performs a linear movement when being acted upon;
   pulling devices;
   at least one airbag cover connected to said piston via said pulling devices, said at least one airbag cover being movable from a closed position into an open position when said piston is acted upon, said at least one airbag cover, when in the closed position blocking the airbag exit path, and said at least one airbag cover, when in the open position, clearing the airbag exit path; and a helical positive guide for guiding said piston such that said piston, when being acted upon and performing the linear movement, also performs a rotational movement for winding up said pulling devices.

2. The airbag device according to claim 1, wherein:

said piston defines a movement path;

said helical positive guide is configured as at least one guideway along the movement path of said piston; and said piston has at least one extension cooperating with said guideway.

3. The airbag device according to claim 2, wherein said at least one extension rests against said guideway.

4. The airbag device according to claim 2, wherein said at least one extension engages in said guideway.

5. The airbag device according to claim 2, wherein said at least one extension of said piston is an element selected from the group consisting of a bolt and a screw.

6. The airbag device according to claim 2, wherein:

said at least one extension is a plurality of extensions including a first extension and a second extension, said first extension and said second extension are spaced apart from one another in a direction of the linear movement of said piston; and said at least one guideway is a plurality of guideways including a first guideway assigned to said first extension and a second guideway assigned to said second extension.

7. The airbag device according to claim 2, wherein said pulling devices engage on said piston via said at least one extension of said piston.

8. The airbag device according to claim 1, wherein said pulling devices include at least one pulling element selected from the group consisting of a wire, a cable, and a strap for connecting said at least one airbag cover to said piston.

9. The airbag device according to claim 1, wherein said pulling devices include at least one pulling element selected from the group consisting of a metal wire and a metal cable.

10. The airbag device according to claim 1, wherein said pulling devices include at least one strap formed of a material selected from the group consisting of a textile material, a plastic material, and a mixture of textile and plastic materials.

11. The airbag device according to claim 1, wherein:

said airbag module includes a gas generator; and said piston is placed as a cup over said gas generator.

12. The airbag device according to claim 1, wherein:

said airbag module has a housing; and said piston is guided in said housing of said airbag module.

13. The airbag device according to claim 1, wherein:

said airbag module includes a gas generator having a housing; and said piston is guided in said housing of said gas generator.

14. The airbag device according to claim 1, wherein said helical positive guide is configured as at least one guideway along a movement path of said piston, said at least one guideway includes an element selected from the group consisting of a control edge and a slotted guideway.

15. A method of operating an airbag device, the method which comprises:

providing an airbag module having a piston;

providing at least one airbag cover connected to the piston via pulling devices; and subjecting the piston to a pyrotechnical action such that the piston performs a helical movement for winding up the pulling devices such that the pulling devices pull on the at least one airbag cover and move the at least one airbag cover from a closed position blocking an airbag exit path into an open position clearing the airbag exit path.

* * * * *